March 17, 1959 W. P. BOOTHROYD ET AL 2,878,370

MULTI-CHANNEL COMMUNICATION SYSTEM

Original Filed Jan. 14, 1949

2 Sheets-Sheet 1

INVENTORS
WILSON P. BOOTHROYD
EDGAR M. CREAMER, JR.
BY
Brown, Denk & Synnestvedt
AGENTS March 17, 1959 W. P. BOOTHROYD ET AL 2,878,370

MULTI-CHANNEL COMMUNICATION SYSTEM

Original Filed Jan. 14, 1949

2 Sheets-Sheet 2

INVENTORS
WILSON P. BOOTHROYD
EDGAR M. CREAMER, JR.
BY
Brown, Denk & Synnestvedt
AGENTS

United States Patent Office 2,878,370

Patented Mar. 17, 1959

2,878,370

MULTI-CHANNEL COMMUNICATION SYSTEM

Wilson P. Boothroyd, Huntingdon Valley, and Edgar M. Creamer, Jr., Philadelphia, Pa., assignors to Philco Corporation, Philadelphia, Pa., a corporation of Pennsylvania Original application January 14, 1949, Serial No. 70,953, now Patent No. 2,680,153, dated June 1, 1954. Divided and this application May 28, 1954, Serial No. 433,042

3 Claims. (Cl. 250—27)

The present invention relates to a modulator. While the modulator of the present invention is particularly adapted for use in a multi-channel communication system of the pulse-amplitude-modulation type, its use is not limited thereto.

This application is a division of an application filed by the present applicants on January 14, 1949, Serial Number 70,953, which issued on June 1, 1954 as U. S. Patent No. 2,680,153.

A principal object of the present invention is to provide an improved modulator.

A more specific object is to provide a modulator suitable for use in a pulse-amplitude-modulation communication system of the type described and claimed in the parent application referred to above.

In the drawing of the present application;

Figure 1:
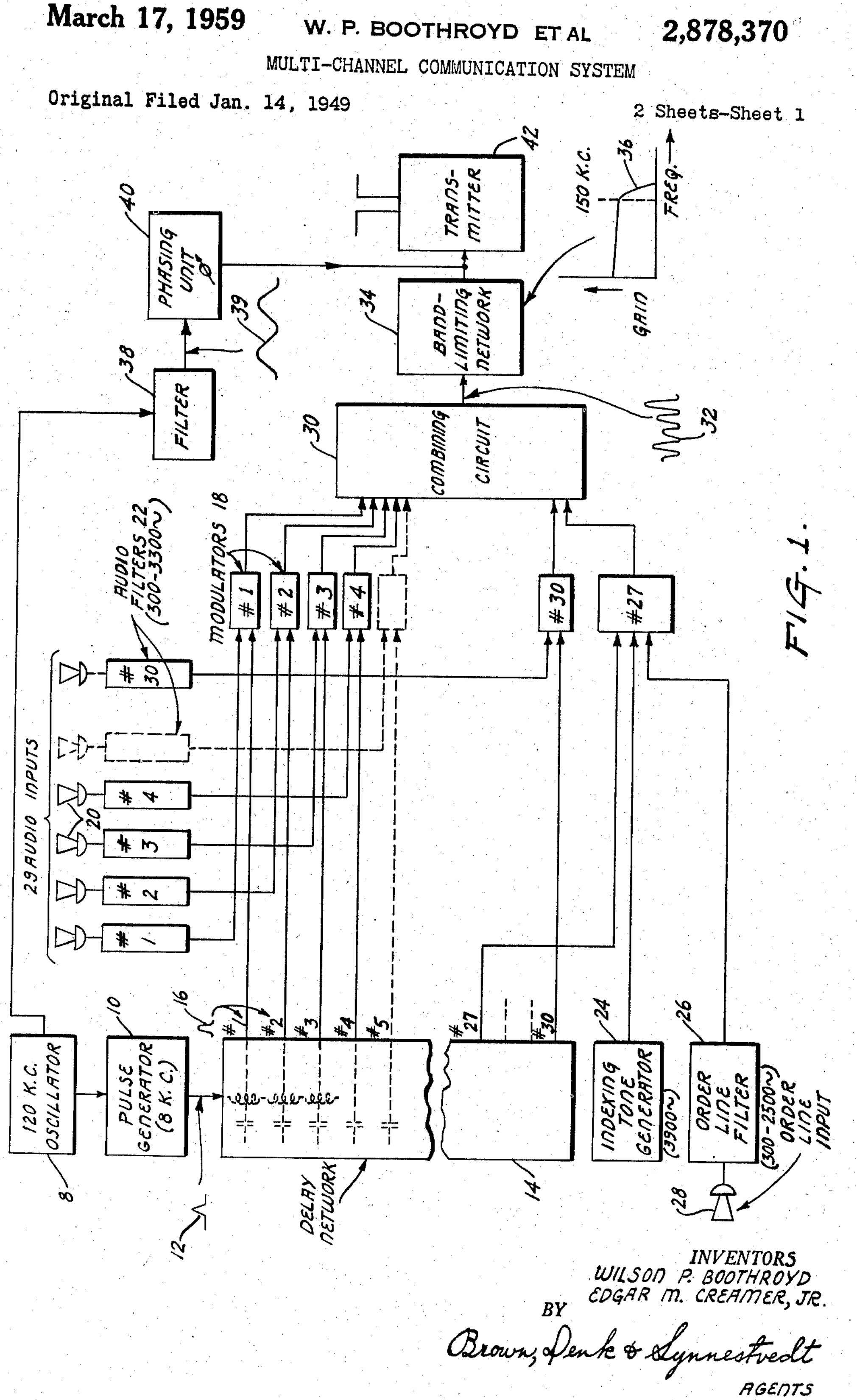
Figure 1 shows a block diagram of a preferred form of multiplex communication transmitter system.

Referring now to Figure 1, there is shown a schematic block diagram of a preferred form of pulse-amplitude-modulated multiplex transmitting system. This system includes a 120 kilocycle oscillator 8 operating in timed relation with a pulse generator 10. The latter produces a series of uniform and uniformly spaced triangular pulses having a constant repetition rate. While the pulse generator 10 may be of any suitable type known in the art, one particularly appropriate design is described and claimed in U. S. Patent No. 2,616,047, granted October 28, 1952 to W. P. Boothroyd.

The repetition rate of the pulses produced by the generator 10 is 8 kilocycles. In other words, the peak of each pulse is spaced in time from the peak of the immediately preceding pulse by an interval of 125 microseconds. Furthermore, for reasons which will later become apparent, each triangular pulse has an effective width at its base which is no greater than 8 microseconds.

These pulses from the generator 10, which may have a waveform such as shown in the drawing by the reference numeral 12, are applied to the input terminal of a delay network 14. This network 14 may be of any form known in the art, such, for example, as a plurality of series-connected inductors and shunt-connected capacitors arranged to form individual sections or units. Network 14 is provided with 30 equally-spaced output taps chosen so that the time delay for each section of the network is approximately 4.16 microseconds. The total delay interval for the entire network is thus 4.16·30, or 125 microseconds, and is substantially equal to the period of the pulses 12. Such delay networks are known in the art, but one type of delay network which is particularly suited for this purpose is shown in the aforesaid Boothroyd Patent 2,616,047.

In order that the delay network 14 may remove the high-frequency components present in the pulse output of the generator 10, a low-pass filter is incorporated therein. This filter is designed to have a cut-off frequency of, for example, 200 kilocycles. It may take the form of a number of extra L–C sections located at the input end of the delay network. Accordingly, the pulses 12, which appear successively at the output taps #1–#30 of the network 14, have a waveform in which the sharp peak of each pulse is rounded off, as shown by the reference numeral 16.

The characteristic impedance of the delay network 14 is of course determined by the particular values of the inductors and capacitors making up the assembly. It has been found in practice that a characteristic impedance of 2500 ohms will produce satisfactory results, and a suitable terminating impedance of this value is used.

One important characteristic of the delay network 14 is that it does not introduce any appreciable change in the waveform of the pulses 16 as they travel therealong. After the output pulses 12 from the generator 10 have passed through the first few sections of the delay network 14 (which constitute the low-pass filter), and have arrived at the first output tap of the network with the shape shown at 16, no significant change occurs in the waveform of the pulses until after they pass the last output terminal #30.

Summarizing the above, a pulse 12 applied to the input terminal of the network 14 appears at the output taps #1–#30 with the waveform 16 successively at times spaced approximately 4.16 microseconds apart. The wave retains substantially this same shape at each output terminal of the network.

The transmitting system of Fig. 1 is designed to multiplex thirty audio channels on a time-sharing basis. This is accomplished by sampling the intelligence signal in each channel at a rate equal to at least twice the highest frequency contained therein. This sampling process detects the instantaneous amplitude of the intelligence signal at the instant when sampling occurs, and, since the channels are sampled in sequence, the channel information is available for intermixing into a composite multiplexed signal.

As the pulse 16 passes the various output taps of the network 14 in sequence, it becomes a timing wave for the purpose of sampling the respective intelligence channels. The embodiment of the invention illustrated includes thirty such channels, although this number was arbitrarily chosen and thus is merely exemplary. One of these channels transmits an indexing tone for synchronizing purposes and is also used as an order line. The remaining twenty-nine channels are available for audio communication.

Each of the thirty output taps or terminals of the delay network 14 is connected to one of thirty modulators 18. Twenty-nine of these modulators also receive signals from twenty-nine audio input channels, each of which includes a microphone 20 or other source of audio frequency signals. In order that all frequencies outside the 300 to 3,300 cycle range may be eliminated from the output of the microphones 20, a filter 22 is provided in each audio channel. The output of each filter 22, therefore, is an audio signal having no frequency higher than approximately 3,300 cycles per second.

Each of these audio signals is applied to its respective modulator 18, which also receives a timing signal, in the manner above described, from one output tap on the delay network 14. Inasmuch as the highest audio frequency is limited by the filters 22 to a value of approximately 3,300 cycles per second, it will be seen that the 8 kilocycle wave 16 will sample the audio information in each channel at a rate equal to at least twice the highest audio frequency. Furthermore, the amplitude of the 8 kilocycle energy appearing at the output of any particular one of the modulators 18 will depend upon the instantaneous value of the audio signal applied to that particular modulator at the instant when a sampling pulse is also applied thereto. Thus the signal in each audio channel may be transmitted without any appreciable loss of the information contained therein.

The single remaining modulator #27 receives both an indexing tone at a frequency of 3,900 cycles from a generator 24 and also the output of an order line filter 26. Inasmuch as the order line information in the embodiment described does not require as high a frequency range as that of the remaining audio inputs, the order line filter 26 (which is connected to a microphone 28), has a frequency passband of from 300 to 2,500 cycles. Since the highest frequency applied to the indexing tone and order line modulator is 3,900 cycles per second, the intelligence in channel #27 will still be sampled at least twice per cycle by the 8 kilocycle timing wave 16.

Although any one of the modulators 18 might have been selected to receive the combined output of the indexing tone generator 24 and the order line filter 26, in the present embodiment channel #27 was selected for this purpose. Thus, each one of the thirty modulators 18 is connected to receive a "triggering" pulse in timed sequence from one of the thirty taps on the delay network 14.

The respective outputs of the modulators 18, representing thirty channels of amplitude-modulated pulses, are then combined into a single multiplexed signal by the combining circuit 30. The signal in the output of the circuit 30 may have a waveform such as represented by the reference numeral 32. This wave 32 is a composite multiplexed signal composed of thirty phase-delayed pulses derived from each one of the 8 kilocycle timing pulses 16, or 240,000 amplitude-modulated pulses per second. Each thirtieth pulse in this wave represents the intelligence of one particular channel.

One of the principal features of the system shown and described in the parent application, Serial No. 70,953, of which this application is a division, resides in the ability of the apparatus there disclosed to operate with a bandwidth which is approximately equal to the normal spectrum of the multiplexed signal. It has been found that the transmitted intelligence will be reproduced with negligible distortion if the 8 kilocycle sampling wave is transmitted with a substantial number of its harmonics, each of these harmonics having sidebands extending a distance on each side thereof equal approximately to the highest channel frequency. It has furthermore been found that an unmodulated reference wave representing the 240 kilocycle sampling frequency is desirable at the receiver in order to aid in the demodulation of the multiplexed signal.

According to this feature of the system shown and described in the parent applicant, a transmission bandwidth of only approximately 150 kilocycles is required. Although this permits transmission of an appreciable number of the harmonics in the 8 kilocycle sampling wave, it does not permit transmission of the unmodulated 240 kilocycle wave. However, if a subharmonic of this 240 kilocycle frequency is derived at the transmitter (such as 120 kilocycles, for example), it may be added to the transmitted signal and then restored to its original form at the receiver by utilizing a suitable frequency-doubling circuit.

In order that the multiplexed signal may be transmitted within the above-mentioned 150 kilocycle passband, the composite signal 32 is applied to a band-limiting network 34 which in effect consists of a low-pass filter having a response which drops only gradually up to 150 kilocycles but then falls off sharply until it is down substantially 40 db at 260 kilocycles. This band-limiting apparatus permits transmission of the 8 kilocycle sampling wave with a number of its harmonics (up to at least the fifteenth), and, furthermore, passes the two sidebands of each of these harmonics with substantially equal amplitude. However, it is recognized that the cut-off of the band-limiting network 34, such as shown by the response curve 36 in Fig. 1, will introduce considerable crosstalk into the signal 32 unless it is compensated for. The means for producing such a compensation are an essential portion of the invention, and will be fully described in connection with a description of the receiving apparatus, as set forth below.

A portion of the output of the oscillator 8 is applied to a 120 kilocycle filter 38, which may also, if necessary, include suitable clipping and amplifying means for producing an output wave 39 of constant amplitude. Any necessary phasing of the wave 39 may be brought about by a phasing unit 40. The output of the unit 40 is combined in properly timed relation with the output of the band-limiting network 34, and the resulting wave is employed to modulate either a transmitter 42 or any other type of translating device. However, it should be understood that the wave representing the combined outputs of the band-limiting network 34 and the phasing unit 40 may also be transmitted by a cable or other form of wire-transmission medium.

Figure 2:
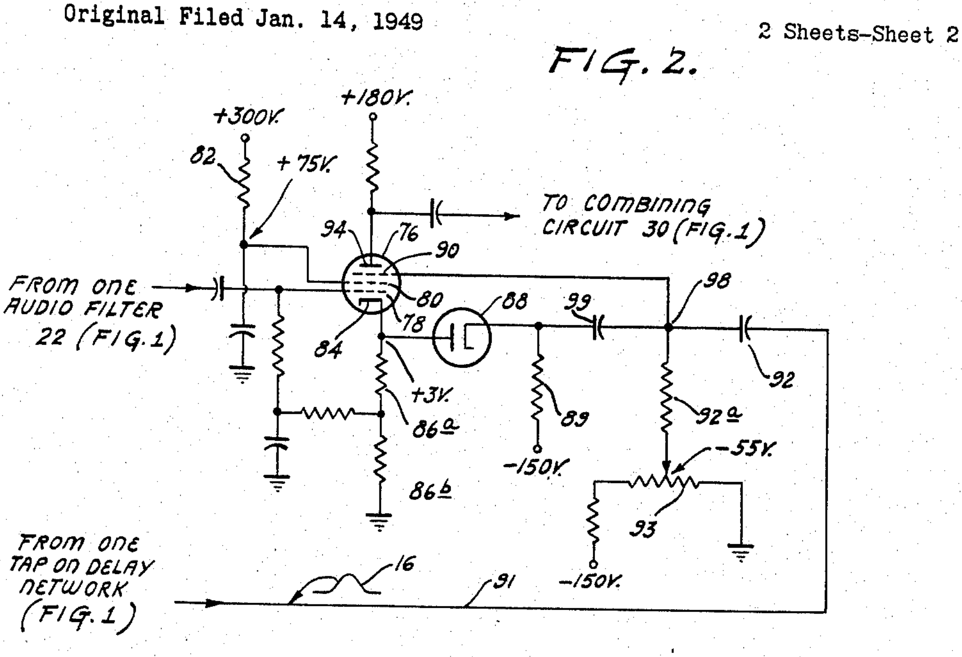
Figure 2 is a circuit diagram of a preferred form of modulator included in the transmitter system of Figure 1.

In Fig. 2 is shown a preferred type of circuit for accomplishing the function of each individual modulator 18 in Fig. 1. It will be appreciated that it is the purpose of each such modulator 18 to act as a gating circuit which effectively connects the output of its respective audio filter 22 to the modulator output circuit (combining circuit 30) in accordance with the application to the modulator of one of the timing pulses 16 from the delay network 14. The outputs of the respective modulators are then consolidated as shown in Fig. 1 in the combining circuit 30. It will be further appreciated that the modulator 18, or gating circuit, must be closed to the output of its associated audio filter 22 at all times except when it is opened by the application thereto of one of the timing pulses 16 from the delay network.

Accordingly, each one of the modulators 18 in Fig. 1 may include a pentode 76 (as shown in Fig. 2) to the control grid 78 of which the output of an audio filter 22 is applied. The screen grid 80 of tube 76 is connected to a source of positive potential through a resistor 82. The cathode 84 of the tube is connected to ground through two series resistors **86*a* and 86*b*, and is also connected directly to the anode of a diode 88. The cathode of diode 88 is connected to a source of negative potential through the resistor 89**.

The pulses 16 from the delay network 14 are applied with positive polarity to the suppressor grid 90 of the pentode 76 by means of conductor 91 and condenser 92. The bias on suppressor grid 90 is maintained at a selected negative potential in excess of cut off by having its leak resistor **92*a* connected to the arm of the potentiometer 93 which is connected between a negative potential source and ground. The output of the pentode 76 is taken directly from its plate 94, and is applied as shown to the combining circuit 30** (Fig. 1).

The audio voltage from the filter 22 in Fig. 1 is accordingly applied to one grid of the pentode 76, while the timing pulses 16 from the delay network 14 are applied to another grid of the same tube. In this manner, the pentode is gated upon by the timing pulses so as to pass into its anode circuit a voltage representative of the instantaneous amplitude of the audio signal during the presence of the gating pulse. However, it has been found that the amplitude of the output signals from anode 94 will not be linearly related to the applied audio signal unless the gating voltage on its suppressor grid 90 can be made to vary as a function of variations in the audio voltage appearing on its control grid 78 and hence on its cathode 84.

The means for bringing about such a correlation in the applied tube potentials includes the diode 88. Since the voltage on the anode of this diode is substantially the same as the voltage on its cathode under normal operating conditions, because the diode is normally conducting, it will be seen that the alternating component of its anode voltage (which is the voltage on the cathode 84 of the pentode 76) will traverse condenser 99 and appear on the suppressor grid 90 substantially without change. Hence, the gating voltage of tube 76 will in effect be superimposed upon this varying cathode voltage, and thus will vary as a function of variations in the amplitude of the audio signal.

The division of current between the screen grid 80 and the anode 94 of pentode 76, at a constant suppressor grid voltage relative to the cathode, is a function of the current in the triode section of the tube. Thus some curvature is introduced into its cathode current-plate current characteristic which must be corrected if amplitude distortion of the audio signal is to be avoided. This correction is brought about by intentionally predistorting to a selected degree the grid voltage-cathode current transfer characteristic of the tube. Since this intentional distortion is in an opposite sense to the cathode current-plate current curvature, the two types of non-linearity may be caused largely to cancel one another, resulting in a compensated overall characteristic which has substantially less undesired curvature than the uncompensated characteristic alone.

The circuit of Fig. 2 is designed as to include cathode degeneration and thereby to provide an amplitude-modulated output in which substantially no width modulation of the pulses is present. As shown by the waveform 95 in Fig. 3, the anode voltage of tube 76 remains at a level of approximately 180 volts positive when no plate current is flowing. The voltage on the screen grid 80 is approximately +75 volts. The two series resistors **86*a* and 86*b* act to hold the cathode 84 at a potential of approximately 3 volts above ground as a result of the flow of screen current. Since the suppressor grid 90 is normally maintained at a potential of −55 volts, no plate current normally flows in the tube. However, when the suppressor grid 90 reaches a voltage of −10 volts with respect to ground as shown in curve 96, current flows to lower the tube plate voltage as shown in curve 95**. The cathode current is unchanged by this transfer of screen current to the plate.

A typical portion of the signal from the audio filter 22 is shown in curve 97, and is applied to the control grid 78. This control grid 78, the screen grid 80, and the cathode 84, act together as a triode to produce an audio voltage at the cathode which varies between +1 and +5 volts under peak input conditions. This voltage is conducted through the diode 88 to the suppressor grid 90 to swing the voltage on this grid between −53 and −57 volts, approximately.

Figure 3:
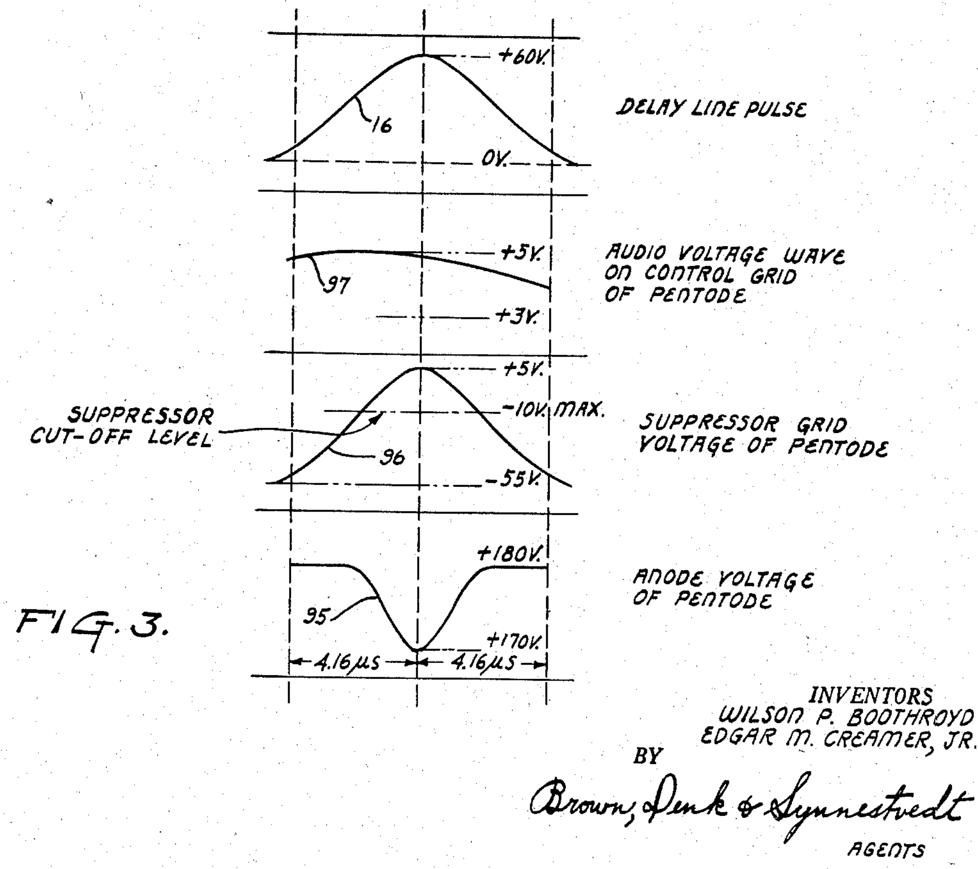
Figure 3 is a set of waveforms which will be helpful in explaining the operation of the modulator of Figure 2.

The timing pulse 16 is also shown in Figure 3, and is present at the junction 98 for a period of 8.33 microseconds in each cycle of operation. The positive voltage at this junction 98 drives the suppressor grid 90 from −55 volts to +3 volts (as shown in curve 96) in the absence of an audio voltage, or to between +1 and +5 volts if an audio voltage is present. Because of the presence of this audio voltage on the cathode 84, the control grid 78, and the suppressor grid 90 of the pentode, the time at which the pulse 16 causes conductance to commence in the anode circuit of the tube is definite and independent of the audio voltage. The same is true of the time at which conductance ceases. The amount of plate current which flows at the peak period of the pulse 16 depends upon the magnitude of the audio voltage, and is such as to cause a variation in the plate voltage of the tube from a nominal value of 178 volts to approximately 177 or 179 volts.

When the timing pulse 16 begins, it cuts off the diode 88. This prevents the internal impedance of the pentode, and the impedance of its cathode resistor, from placing a load on the delay network 14.

While the resistor 89, which is returned to −150 volts, permits the discharge of condenser 99 when the cathode 84 of tube 76 swings in the negative direction after a positive excursion, nevertheless the time constant of this combination is so chosen that condenser 92 retains substantially all of its charge during the presence of the timing pulse 16. It is this charge, as varied at an audio rate through the diode 88, that forms the base, or pedestal, for the timing pulse 16.

Having described our invention, we claim:

1. In combination: an electron discharge tube having at least anode, cathode, and first and second control grids; a source of amplitude-modulated signals; an impedance having substantial magnitude at the frequency of said applied signals connected between said cathode and a point of fixed reference potential; means for applying said signals between said first control electrode and said point of fixed reference potential to vary the potential of said cathode in accordance with the instantaneous amplitude of said applied signals; a source of positive timing pulses; means for applying said timing pulses between said second control grid and said point of fixed reference potential to render said tube conductive; and means including a diode and a capacitor connected in series between said cathode and second control grid to vary the potential of said second control grid in accordance with variations in said cathode potential, the anode of said diode being connected to said cathode of said electron discharge tube, whereby said tube is rendered conductive at intervals controlled by said timing pulses substantially independently of the amplitude of the said applied signals during said intervals.

2. A gating circuit for a time varying signal, said circuit comprising: a vacuum tube having cathode, anode and plural control grid electrodes; means for applying said signal to one of said control grid electrodes; means for producing, at said cathode, variations in potential corresponding to the variations in amplitude of said applied signal; means for applying to another one of said control electrodes a bias potential of such magnitude and polarity as to maintain said tube cut off; means for intermittently applying to said other control grid electrode a potential of such polarity and amplitude as to overcome said cut-off potential and render said tube conductive; and means for superposing, on said potential applied to said other control grid electrode, variations substantially corresponding to said cathode potential variations, said last-named means comprising a unilaterally conductive device and a charge storage means connected in series between said cathode and said other control grid electrode, said unilaterally conductive device being connected with such polarity as to be rendered non-conducting by the application of said intermittently applied potential to said other electrode and said charge storage means having such charging time-constant as to become charged to substantially said cathode potential during conduction of said unilaterally conductive device and having a sufficiently long discharge time-constant to remain substantially at said cathode potential during any one application of said intermittently applied potential to said other control grid electrode.

3. The apparatus of claim 2 further characterized by the provision of means for applying to said unilaterally conductive device a bias potential of such amplitude and polarity as to maintain said device in conduction except during the application of said intermittently applied potential.

References Cited in the file of this patent

UNITED STATES PATENTS

| | | |
|---|---|---|
| 2,405,238 | Seeley | Aug. 6, 1946 |
| 2,549,780 | Earp | Apr. 24, 1951 |
| 2,591,088 | Millman et al. | Apr. 1, 1952 |

FOREIGN PATENTS

| | | |
|---|---|---|
| 643,471 | Great Britain | Sept. 20, 1950 |